United States Patent [19]

Lake, Jr. et al.

[11] Patent Number: 4,872,023

[45] Date of Patent: Oct. 3, 1989

[54] PLOTTER PLATEN MAPPING SYSTEM

[75] Inventors: Ralph J. Lake, Jr., Yorba Linda; Franklyn L. Wiley, Long Beach; A. Daniel Coby, Brea; John Pluth, Jr., Hacienda Heights, all of Calif.

[73] Assignee: Sanders Associates, Inc., Nashua, N.H.

[21] Appl. No.: 141,652

[22] Filed: Jan. 7, 1988

[51] Int. Cl.$^4$ ............ G01D 15/24; G01D 9/00; G06K 15/00
[52] U.S. Cl. ................ 346/1.1; 346/139 R; 364/520
[58] Field of Search ............ 346/139 R, 1.1; 364/520

[56] References Cited

U.S. PATENT DOCUMENTS

| | | | |
|---|---|---|---|
| 4,567,565 | 1/1986 | Haselby | 346/139 R |
| 4,585,938 | 4/1986 | Neumann | 250/235 |
| 4,660,055 | 4/1987 | Enda | 346/139 R |

Primary Examiner—E. A. Goldberg
Assistant Examiner—Mark Reinhart
Attorney, Agent, or Firm—Donald A. Streck; Wm. F. Porter, Jr.

[57] ABSTRACT

A method and apparatus for providing platen mapping for known clearance pen movement in a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with, for raising it from contact with the paper, and for providing a relative vertical position value signal. Vertical sensing apparatus is connected to the penholding apparatus for sensing the top surface of the platen. First logic is operably connected to the vertical sensing apparatus and to receive the vertical position value signal from the controlled raising and lowering mechanism for calculating and saving a plurality of deviation values indicating the distance deviation of the platen top surface from parallel at a plurality of spaced points across the platen. Finally, second logic is operably connected to the controlled raising and lowering mechanism for adjusting the position of the penholding apparatus as a function of the deviation values to maintain the penholding apparatus at a known distance from the top surface of the platen as the penholding apparatus is moved transversely across the platen. Various methods of pen movement employing the platen mapping data are shown. In the preferred method, the pen is raised to a full up position for initial movement and ramped down to a known spacing for final pen drop. Adjustment of pen positioning for rotational deviation and pen dropping "on the fly" are also disclosed.

6 Claims, 3 Drawing Sheets

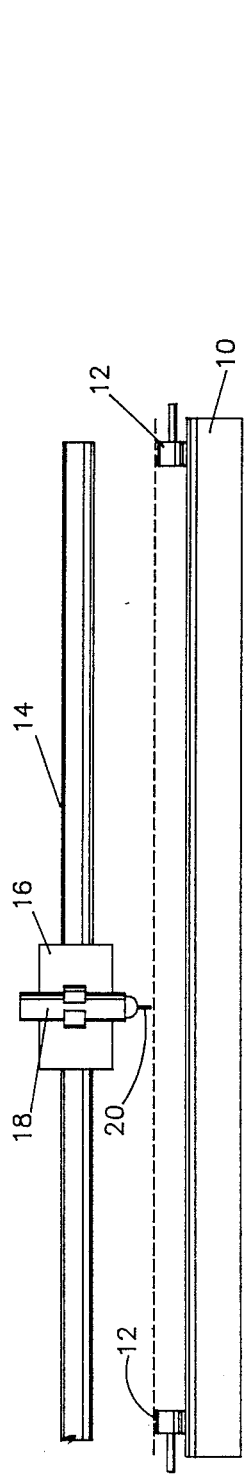
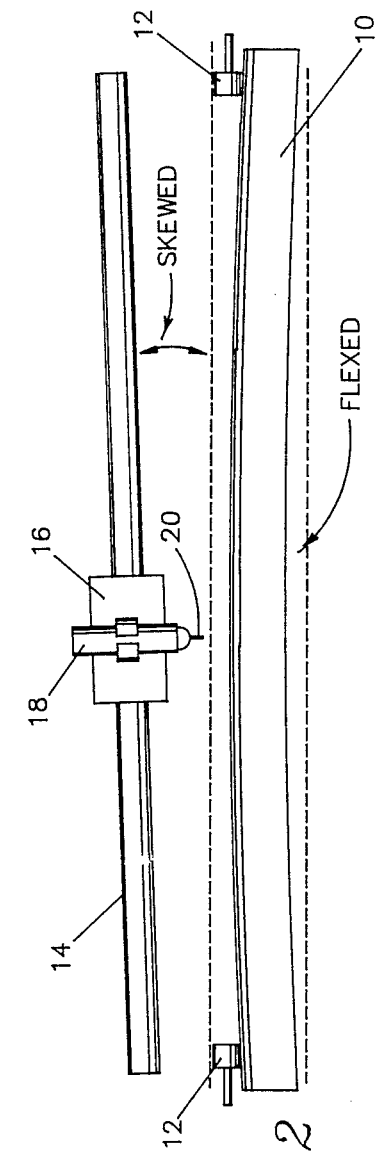
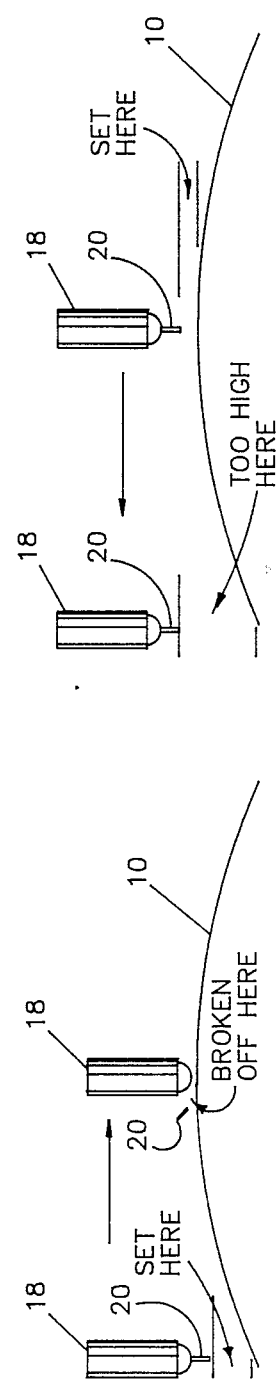
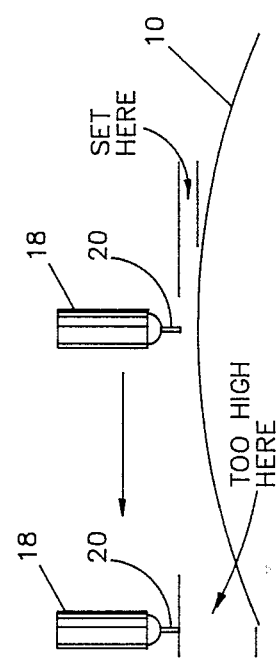
FIG. 1
FIG. 2
FIG. 3
FIG. 4

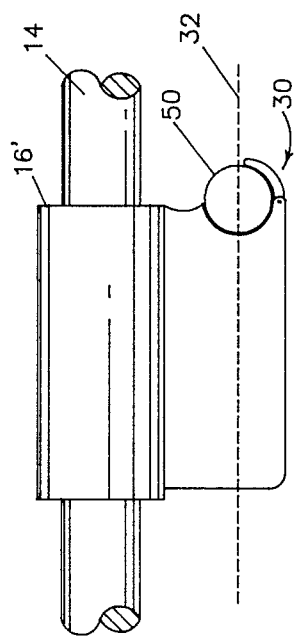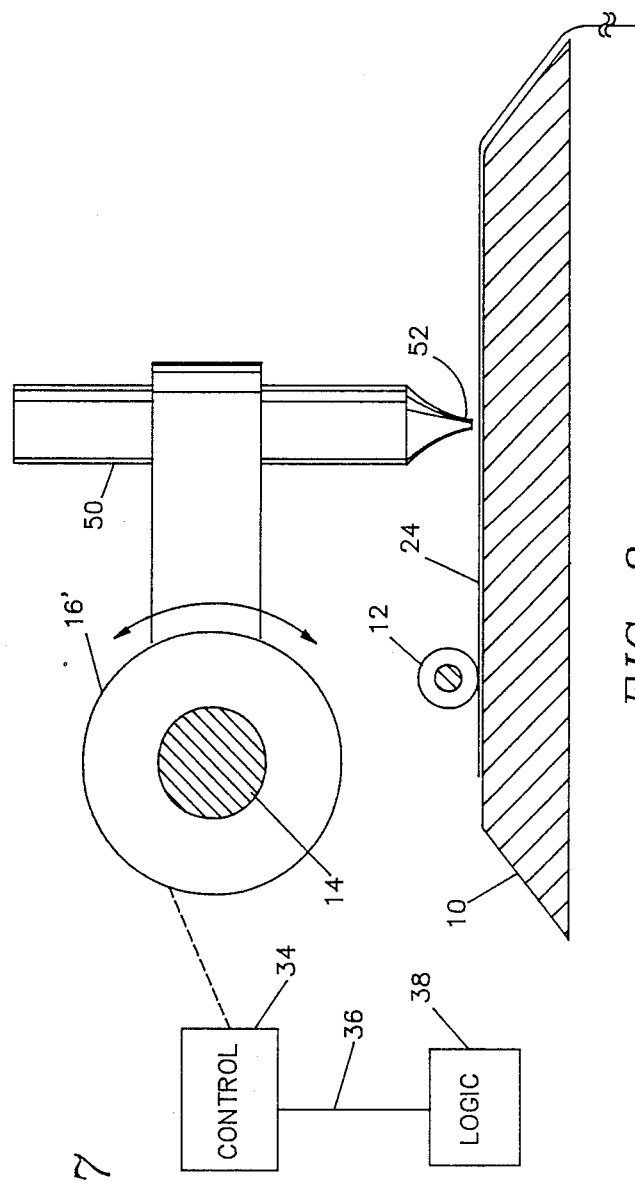

PLOTTER PLATEN MAPPING SYSTEM

BACKGROUND OF THE INVENTION

The present invention relates to graphics plotters and, more particularly, in a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with and for raising it from contact with the paper and for providing a relative vertical position value signal, to the improvement for allowing known pen spacing from the paper during pen movement comprising, vertical sensing means carried by the penholding apparatus for sensing the top surface of the platen; means operably connected to the vertical sensing means and to receive the vertical position value signal from the controlled raising and lowering mechanism for calculating and saving a plurality of deviation values indicating the distance deviation of the platen top surface from parallel at a plurality of spaced points across the platen; and, means connected to the controlled raising and lowering mechanism for adjusting the position of the penholding apparatus as a function of the deviation values to position the penholding apparatus at known distances from the top surface of the platen as the penholding apparatus is moved transversely across the platen.

The original graphics plotters as employed with computers to create two-dimensional graphics and drawings comprised a flat table upon which the drawing paper was fastened and over which a printhead assembly was moved by a beam also moving on spaced tracks parallel to one another. Such plotters were large and cumbersome, particularly with larger so-called "D" and "E" sized drawings as typically used in commercial applications. More recently, a single, non-moving-beam system such as that represented by the critical elements thereof in FIG. 1 has been employed as the standard approach to plotting. In such a plotter, there is a platen 10 over which the paper (not shown) is draped to be moved longitudinally for one axis by a pair of driven pinch-rollers 12 positioned at the respective edges of the paper. Ideally, the top surface of the platen 10 is completely straight. The single beam 14 (typically in the form of a rod or bar) is disposed above and parallel to the top surface of the platen 10. Again, ideally, the beam 14 is completely straight and parallel to the top surface of the platen 10. A driven penholder 16 releasably gripping a pen 18 is moved transversely across the paper from side to side to create the other axis. An appropriate mechanism (not shown) is connected to raise and lower the pen 18 as by rotating the penholder 16 about the beam 14. As is well known, the pen 18 is lifted during movement from point to point on the drawing wherein no line is to be created and then lowered to contact the paper for subsequent movement creating the lines of the drawing. Ideally, as indicated in FIG. 1, the writing tip 20 of the pen 18 moves transversely over the top surface of the platen 10 at a constant spacing when raised. Unfortunately, it is impossible to mechanically create the ideal situation of FIG. 1. In actuality, there is component misalignment and mis-shaping in the manner of FIG. 2. Either or both the platen 10 and beam 14 can be skewed vertically and/or horizontally from the desired true horizontal and parallel positions. Thus, even if straight, the platen 10 and the beam 14 could diverge and converge creating differences in the spacing therebetween. Additionally, both the platen 10 and beam 14 may be flexed or otherwise distorted along the length thereof from a true straight condition. This, too, creates differences in the spacing between the writing tip 20 and the top of the platen 10 as the pen 18 is moved from side to side over the platen 10.

It should be noted at this point that the deviations from true straight and parallel are typically quite small. Unfortunately, the desired operating clearances are also quite small for purposes to be addressed shortly hereinafter. The result is as shown in FIGS. 3 and 4, which are exaggerated for purposes of demonstration as was FIG. 2. Assuming a simple upward flexing of the platen 10, if the clearance distance between the writing tip 20 and the top of the platen 10 is set to its desired minimal clearance at the outer edges, the writing tip 20 may actually strike the platen 10 upon reaching the raised center portion thereof and, in an extreme situation, could be bent or broken off as depicted in FIG. 3. At the least, it could contact the paper and make undesired marks thereon. As depicted in FIG. 4, if the clearance is set at the higher center portion, there will be far too much clearance at the lower outer edges. This of course begs the question as to why a minimal clearance is desirable or necessary. There are several reasons which can be best understood with reference to FIGS. 5 and 6. As depicted in FIG. 5, the pen 18 is raised and lowered (referred to in the art as "dropped") by rotating the driven penholder 16 about the cylindrical beam 14 as indicated by the arrows 22. Again in greatly exaggerated representation, FIG. 6 shows the result of pen dropping by rotation. As can be seen and appreciated from the drawing, since the writing tip 20 is moving along a circular arc (as opposed to being raised and lowered along a vertical line), if the arc of movement is large (relatively speaking), there is an appreciable deviation between the vertical position of the writing tip 20 above the paper and its actual point of contact with the paper upon being dropped. Thus, one aspect of knowing the drop distance is the ability to minimize the difference between desired pen position and actual pen position resulting from the rotational dropping of the pen; that is, by knowing the drop distance at any point, adjustment for the delta P shown in FIG. 6 can be affected by the logic so that the actual pen position on the paper is identical to the desired pen position.

Another aspect of a minimal drop distance is the maximization of through-put. Typically, the pen 18 is moved in a raised position to a desired point of line beginning. Movement then stops while the pen is dropped and doesn't continue until the dropping action has been completed. Again, while the differences in time involved between a minimal drop distance and large drop distance are in fractions of a second, in modern highspeed plotters, this time when accumulated over a continuing series of pen raising and lowering (as when drawing short-vectored alphanumeric text materials) can significantly affect the through-put of the plotter. The ability to attain a known drop distance also potentially affects the through-put of plotters in general through the changing of the manner in which they operate. At present, as mentioned above, movement of the pen 18 along the two axes is stopped while the pen 18 is raised and lowered. With the ability to attain a known drop distance, it would be possible to eliminate the stopping and starting during pen raising and lowering. By being able to accurately anticipate the point at which to begin pen lowering in order to have the writing tip 20 contact the paper at the desired point of line beginning, through-put would be increased even further.

Wherefore, it is an object of the present invention to provide a method and apparatus for mapping the platen in a graphics plotter to provide run-time compensation for deviations between a true straight and parallel orientation between the writing tip of the pen and the top surface of the platen.

It is another object of the present invention to provide a method and apparatus for adjusting the pen down position for accuracy in a graphics plotter in which the pen is dropped by rotating it about a horizontal axis.

It is still another object of the present invention to provide a method and apparatus for maximizing throughput as a function of the pen down time consumption in a graphics plotter in which the pen is dropped by rotating it about a horizontal axis.

Other objects and benefits of the present invention will become apparent from the detailed description contained hereinafter taken in conjunction with the accompanying drawing figures.

SUMMARY

The foregoing objects have been achieved in a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with and for raising it from contact with the paper and for providing a relative vertical position value signal, by the improvement of the present invention for allowing known pen spacing from the paper during pen movement comprising, vertical sensing means carried by the penholding apparatus for sensing the top surface of the platen; means operably connected to the vertical sensing means and to receive the vertical position value signal from the controlled raising and lowering mechanism for calculating and saving a plurality of deviation values indicating the distance deviation of the platen top surface from parallel at a plurality of spaced points across the platen; and, means connected to the controlled raising and lowering mechanism for adjusting the position of the penholding apparatus as a function of the deviation values to position the penholding apparatus at known distances from the top surface of the platen as the penholding apparatus is moved transversely across the platen.

In the preferred embodiment, the vertical sensing means comprises a pen shaped test probe carried by the penholding apparatus in the position normally occupied by a pen to be raised and lowered by the apparatus, the test probe having a bottom end positioned to contact the platen and having a constant and known relationship to the writing tip of a pen held by the penholding apparatus.

DESCRIPTION OF THE DRAWINGS

FIG. 1 is a simplified drawing showing the ideal relationship between the platen and moving pen in a contemporary plotter.

FIG. 2 is a simplified drawing showing deviations from the ideal of FIG. 1 which can result from mechanical variations and mechanical flex of the component parts.

FIG. 3 is a simplified drawing showing how damage or undesired marking can result from misaligned parts when minimal clearance is attempted.

FIG. 4 is a drawing in the manner of FIG. 3 showing how overly large clearances can be the result of attempting to prevent damage in a misalignment situation.

FIG. 7 is a top view of apparatus according to the present invention as employed to accomplish the stated objectives thereof.

FIG. 8 is an end view of the apparatus of FIG. 7.

DESCRIPTION OF THE PREFERRED EMBODIMENT

Figure 6:
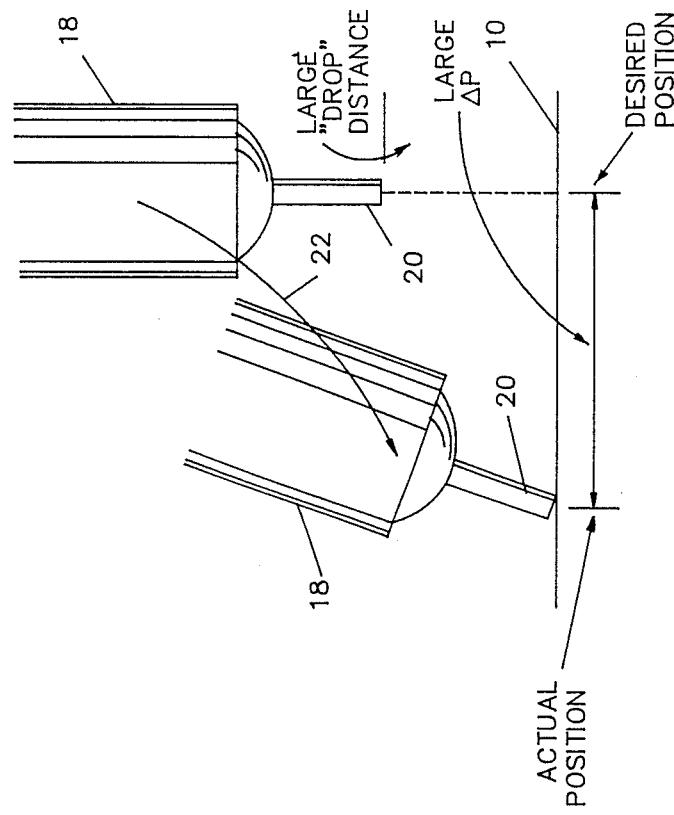
FIG. 6 is an exaggerated, enlarged view of the pen tip of FIG. 5 showing how deviation from anticipated pen position and true pen position can occur when the drop distance is too large.
Figure 5:
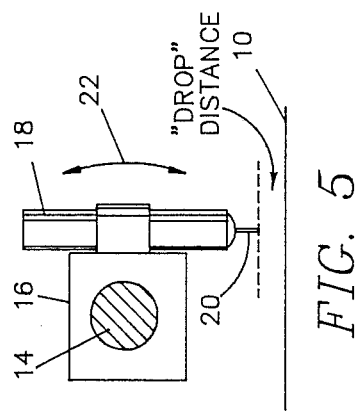
FIG. 5 is a side view of the components of FIG. 1 showing the manner of pen raising and lowering.

The components of the present invention are shown in top and end views in FIGS. 7 and 8, respectively. As with the prior art discussed above, the present invention employs a cylindrical beam 14 upon which a driven penholder 16' is mounted for sliding and rotary movement. The penholder 16' has a releasable gripping mechanism 30 for releasably gripping a pen 18 therein. As the penholder 16' moves along the beam 14 from end to end, the writing tip 20 of the pen 18 moves along the dotted line 32. To raise and lower the pen 18 in the prior art, a so-called "bang bang" approach was used. The prior art penholder 16 is spring-biased in one direction and driven in the opposite direction by a solenoid. Thus, the penholder 16 (and pen 18) bang from one extreme to the other in a completely uncontrolled manner. By contrast, as depicted in simplified form in FIG. 8, the penholder 16' of the present invention is raised and lowered in a controlled manner by the control apparatus generally indicated by block 34. The control apparatus 34 is described in detail in co-pending application Ser. No. 086,950, filed Aug. 19, 1987 and entitled PLOTTER PEN UP/DOWN CONTROL SYSTEM by James Lawrence, which is also assigned to the common assignee of this application. For purposes of this application and the present invention, it is sufficient to say that the control apparatus 34 can accurately raise and lower the penholder 16' and, simultaneously, provide a positional signal on line 36 to the logic 38 of the present invention. According to the present invention, in a manner to be described shortly, the logic 38 in accomplishing the purposes of the present invention can also provide positional control signals over line 36 to the control apparatus 34 whereby the actual position of the penholder 16' relative to its raised and lowered positions can be adjusted to accomplish the purposes and objects of the present invention.

Basically, what is to be accomplished by the platen mapping functions of the present invention is the measuring of the deviation from parallel across the width of the platen 10 between the surface of the platen 10 and the writing tip 20 of the pen 18. The deviation values are stored in the logic 38 and, during plotting, the deviations are applied to the vertical position of the pen 18 so as achieve the objects of the invention. The platen mapping functions can be incorporated within logic 38 to be accomplished either periodically or before every new plot. Where superior precision is desired, the platen 10 could be mapped for each plot with the paper 24 in place so that flexure and deviation of the paper 24 with respect to the surface of the platen 10 can be accounted for as well.

In any event, the actual platen mapping is accomplished by first inserting a pen-shaped test probe 50 into the driven penholder 16' in place of a pen 18, moving the driven penholder 16' to one side of the beam 14, and then moving it in step increments across the platen 10 to measure the deviation values at their respective points and store those deviation values within the logic 38. For this purpose, of course, logic 38 includes memory (not specifically shown). At each point, the penholder 16' is rotated downward by the control apparatus 34 and the positional signal from the control apparatus 34 fed to the logic 38 over line 36. The test probe 50 is rotated in combination with the penholder 16' until the contacting tip 52 contacts the platen 10. The various values are then compared to a reference value and the corresponding deviations stored within logic 38 for run-time use in adjusting the position of the writing tip 20 during "pen up" and "pen down" movements of the penholder 16'. One convenient method of providing the reference value is to pick the lowest value, which corresponds to the lowest point on the surface of the platen 10. All other values can then be referenced as positive deviations from this lowest reference point. The various methods possible and their manner of incorporation into the logic 38 will be readily apparent to those skilled in the art and, therefore, will not be explained in detail in the interest of simplicity and to avoid redundancy.

Figure 9:
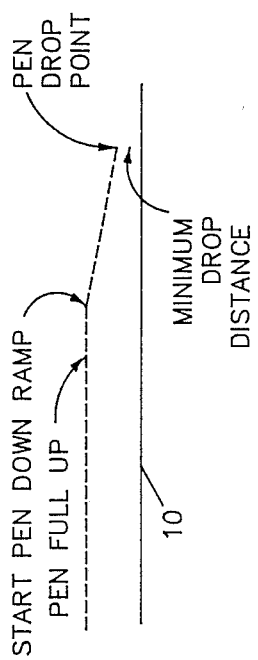
FIG. 9 is a simplified drawing showing the path of pen tip movement in the preferred method of lowering the pen according to the present invention.

At plotting time, the pre-stored deviation values resulting from the platen mapping operation can be used in various ways. With respect to maximizing plotter throughput as it is affected by time occupied by pen down movements, the preferred approach as contemplated by the applicants is to raise the pen holder 16 to a maximum or full pen up position during initial movement across the paper to a new plotting position as depicted in FIG. 9. As the pen 18 approaches the desired position for plotting to continue (and at a pre-established distance therefrom) the logic 38 ramps the pen 18 downward towards a minimum clearance distance, which is achieved just as the pen 18 arrives at the pen down position. The pen 18 is then fully lowered into contact for plotting through this minimal distance—which maximizes plotter throughput. If it were desired, of course, knowing the deviation values would make it possible to ramp the pen 18 down to contact the paper at the desired plot continue point "on the fly" in all, or some, instances so as to completely eliminate the time lost through stopping to lower the pen 18 some, or all, of the time.

With respect to compensating the pen position for rotational deviation, the arc of rotation of the pen 18 is a known value. With the deviation values determined through platen mapping, the rotational distance the pen 18 will move through in dropping at each point in the plot can be readily calculated within the logic 38. Likewise, having calculated the rotational drop distance, the delta P between the actual drop point and the desired drop point can be calculated as well. Once the delta P has been determined, of course, the logic 38 can adjust the drop point to compensate for that delta P.

Wherefore, having thus described our invention, we claim:

1. In a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with and for raising it from contact with the paper and for providing a relative vertical position value signal, the improvement for allowing known pen spacing from the paper during pen movement comprising:
   (a) vertical sensing means carried by the penholding apparatus for sensing the top surface of the platen;
   (b) means operably connected to said vertical sensing means and to receive the vertical position value signal from the controlled raising and lowering mechanism for calculating and saving a plurality of deviation values indicating the distance deviation of the platen top surface from parallel at a plurality of spaced points across the platen; and,
   (c) means connected to the controlled raising and lowering mechanism for adjusting the position of the penholding apparatus as a function of said deviation values to position said penholding apparatus at known distances from the top surface of the platen as the penholding apparatus is moved transversely across the platen.

2. The improvement of claim 1 wherein said vertical sensing means comprises:
   a pen shaped test probe carried by the penholding apparatus in the position normally occupied by a pen to be raised and lowered by the apparatus, said test probe having a bottom end positioned to contact the platen and having a constant and known relationship to the writing tip of a pen held by the penholding apparatus.

3. In a graphics plotter wherein paper is moved over a platen, the method of positioning a pen at known distances form the paper surface as the pen is moved across the platen comprising the steps of:
   (a) measuring the deviation of the platen from parallel to a straight reference line at a plurality of spaced measurement points across the platen;
   (b) storing deviation values at the spaced points; and,
   (c) adjusting the desired position of the pen by the respective deviation values as the pen is moved across the platen between the measurement points.

4. In a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with and for raising it from contact with the paper and for providing a relative vertical position value signal, the method of pen height control during pen movement comprising the steps of:
   (a) raising the pen to a full up position;
   (b) moving the pen towards the next pen down location;
   (c) while the pen is moving and prior to reaching the next pen down location beginning to lower the pen at a pre-established horizontal distance from the next pen down location and continuing to lower the pen as it is moving toward its next pen down position such that the pen ramps downward and attains a pre-established minimum clearance distance just as it arrives at the next pen down location; and, (d) lowering the pen through the minimum clearance distance to a full down position at the next pen down location.

5. The method of claim 4 wherein:

said step of ramping the pen downward to attain a pre-established minimum clearance distance comprises ramping the pen downward to a zero clearance condition in contact with the paper at the next pen down location whereby no pen down time is required, step (d) is virtually eliminated, and pen dropping is accomplished on the fly.

6. In a graphics plotter system having a platen over which paper is moved longitudinally to create one axis, penholding apparatus moved transversely across the platen and the paper to create the other axis, and a controlled raising and lowering mechanism connected for rotating the penholding apparatus to lower a pen being held therein into contact with and to raise it from contact with the paper and for providing a relative vertical position value signal, the method of pen positional compensation comprising the steps of:

(a) mapping deviations from a parallel relationship between the platen and the penholding apparatus at a plurality of spaced points across the width of the platen;

(b) for each pen position calculating the difference in the actual position the pen will contact the platen and the desired position for pen contact as a function of the deviation at the desired position and the arc of movement of the penholding apparatus in lowering the pen; and, (c) adjusting the position at which the pen is positioned for lowering by the calculated difference so that the actual position the pen will contact the platen is the same as the desired position for pen contact.

* * * * *